United States Patent Office 3,700,468
Patented Oct. 24, 1972

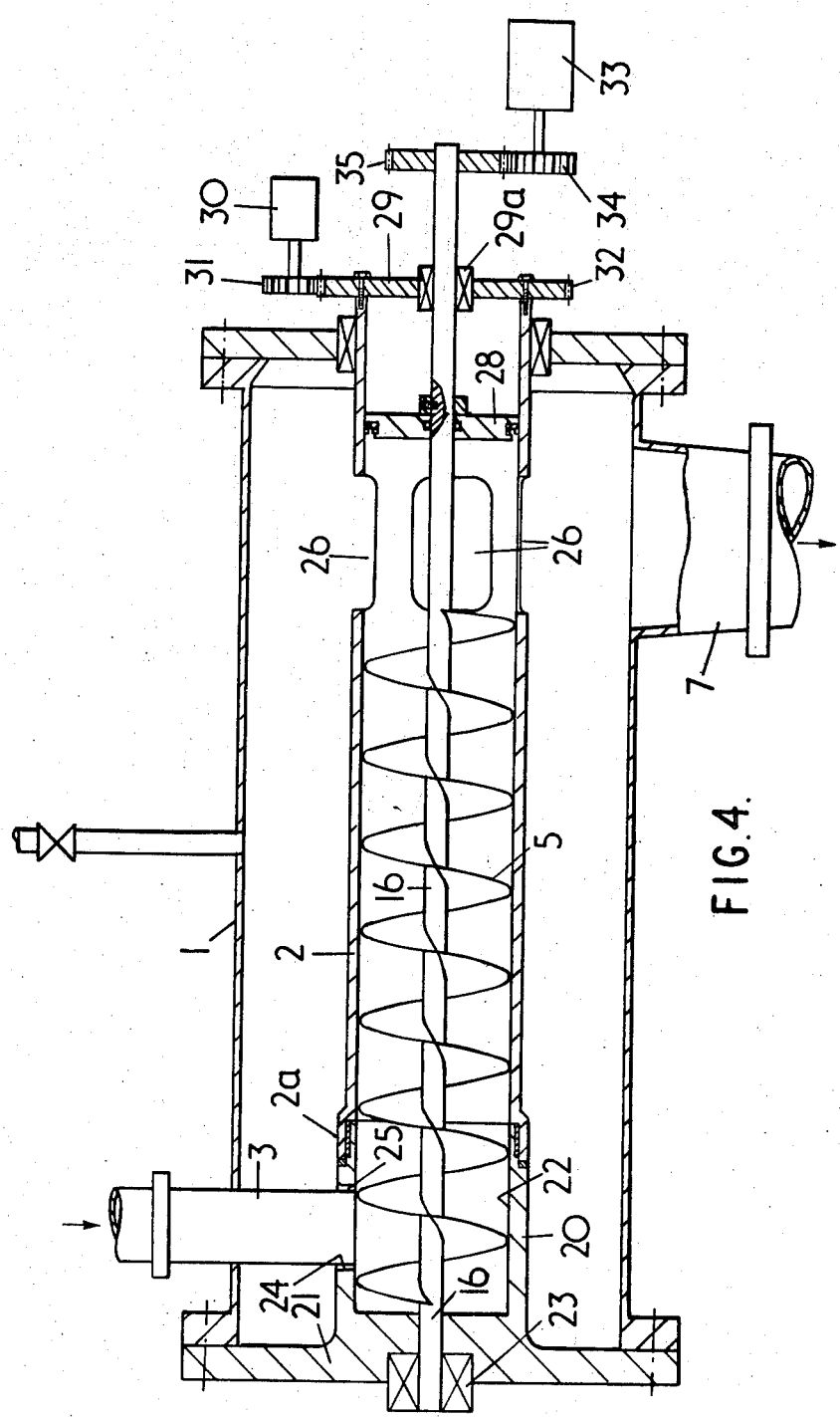

3,700,468
STERILIZING SEPARATE COMPARTMENTS OF PARTICULATE MATERIAL
David Teignmouth Shore, Banstead, and Granville Lewis Starkie, Crawley, England, assignors to The A.P.V. Company Limited, Crawley, England
Filed May 27, 1970, Ser. No. 40,806
Claims priority, application Great Britain, May 28, 1969, 27,009/69
Int. Cl. A23b 1/04
U.S. Cl. 99—216             3 Claims

ABSTRACT OF THE DISCLOSURE

The specification discloses a method and apparatus for sterilizing particulate solid material such as meat cubes or beans. The particles of solid material are positively fed by a conveyor, such as a screw conveyor, through a chamber with an atmosphere of steam or other heating gas, and the residence time determined by the positive feeding is such as to ensure that the required treatment in the chamber is completed.

---

This invention relates to the sterilization of flowable solid materials, with or without a liquid phase, and in particular, but not solely, to the sterilization of particulate food-stuffs.

A primary problem with heat sterilization of solid materials is to insure that the residence time for all particles is sufficient to ensure that the centres of the largest particles reach sterilization temperature. This must be done with a minimum exposure of the whole mass of particles to the sterilizing medium, usually steam, in order to make the use of heat as economical as possible. High holding efficiency is thus the aim.

One prior proposal for continuous cooking of particulate solids is the use of a stationary outer drum and a rotary conical inner drum, which is internally free from baffles or the like. The inner drum is provided with means for introducing steam or other heating gases. The control of residence time of the particles is apparently by controlling the rotational speed of the inner drum so that the particles do not cascade down the coned surface but progress in an orderly manner. The apparatus is thus not wholly satisfactory for sterilization processes where the residence time needs to be very strictly controlled to ensure that each particle has a substantial residence time so that it could not go through the process unsterilized and therefore act as a focus of subsequent infection of a batch, e.g. a can of meat or beans.

It has also been proposed previously to use screw conveyors to convey meat particles through cooking tanks, but no special precautions apparently were taken to ensure the residence of the particles was standardised. The conveyors apparently operated with large clearances in their tanks, so that there was no question of each particle being positively driven.

The present invention consists in a method of sterilizing particulate solid materials, with or without a liquid phase, by mechanically conveying the particles of solid material through an atmosphere of steam at a sufficient temperature for the heat sterilization to be carried out, the particles being conveyed in such manner that their movement is positive and accurately controllable.

The method is preferably used for sterilizing, and the method uses a generally horizontal screw conveyor which is filled with solid particles only to a level below the axis of the screw.

The rate of flow to the conveyor may be controlled by a pump or, if the particles are liable to be damaged by a pump, a rotary or other metering valve in a gravity feed line.

The invention further consists in apparatus for heat treating particulate solid materials comprising a conveyor arranged to pass the solid material positively through a chamber and means for maintaining an atmosphere of hot gas in the chamber.

The invention will be further described with reference to the accompanying diagrammatic drawings which show preferred embodiments of apparatus according to the invention.

In the drawings:

FIG. 4 is a more detailed view of a preferred form of a sterilizing plant according to the invention.

FIG. 1 shows a sterilizing plant for sterilizing the solid particles separately from the liquid phase or in conjunction therewith.

Figure 1:
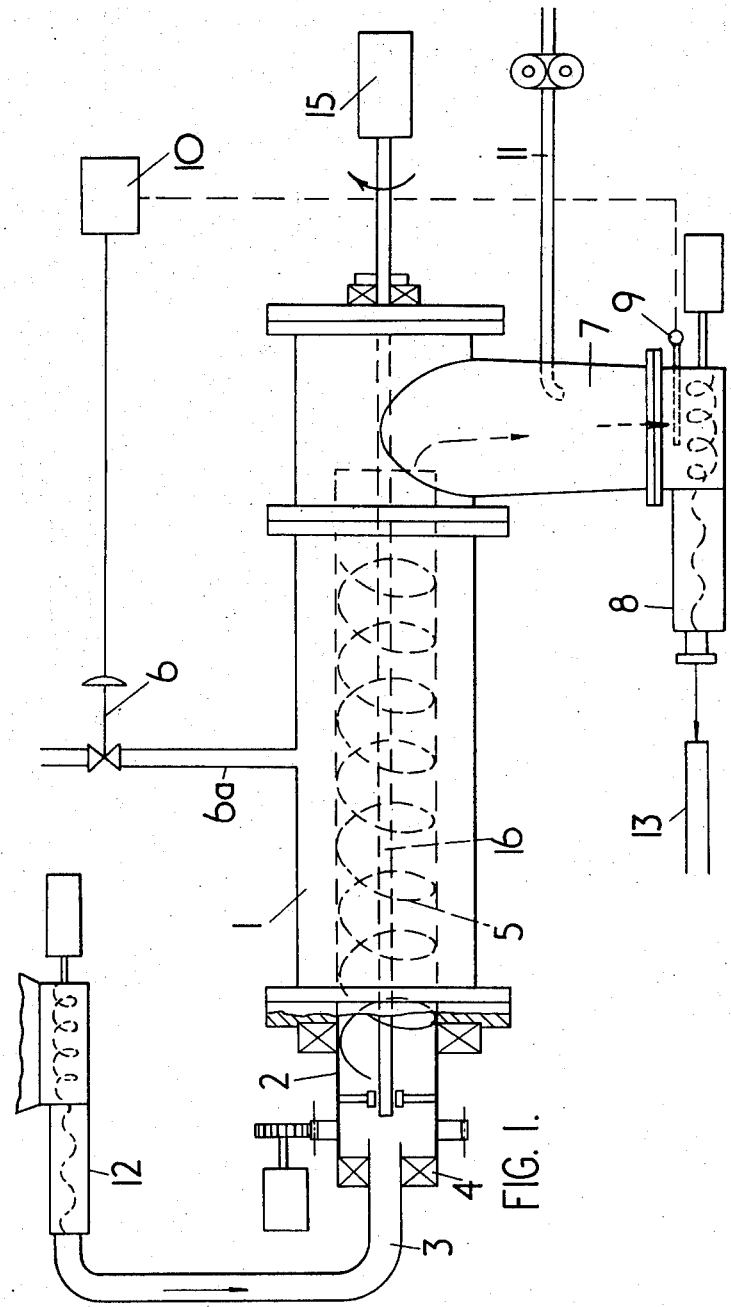
FIG. 1 is a layout diagram of one form of sterilizing plant constituting a preferred embodiment of the invention.

A typical arrangement of the system is shown in FIG. 1. A pressure vessel 1 is suitably equipped to carry an inner rotary perforated cylinder 2. The solid particles are positively fed into the cylinder 2 by a pump 12 through an entry pipe 3 entering the inner perforated cylinder 2 via a rotary seal 4. Inside the perforated cylinder 2 is a helical screw 5 which is rotated by a motor unit 15. The speeds of rotation of the perforated cylinder 2 and the screw 5 are independently adjustable. The screw 5 operates in the cylinder with the minimum practicable clearance.

The screw 5 takes up the particles and transports them along the perforated cylinder 2 during which time they pick up heat from steam entering via an entry pipe 6a and controlled by a control valve 6. The particles fall off the end of the perforated cylinder into a discharge hopper 7 and are pumped away into a holding device 13 by a positive pump 8. A temperature probe 9 in the pump feed hopper measures the outlet temperature of the particles and controls the steam valve 6 by means of temperature controller 10. The liquid phase can enter with the solids at 3, in which case some of it filters through the perforated cylinder 2 and runs along the bottom of the vessel 1 to the outlet hopper 7, becoming heated to sterilizing temperature en route. Alternatively, some or all of the liquid can be pumped in under pressure at 11 in which case it should be preheated beforehand in a heat exchanger or by steam injection to sterilizing temperature. Various devices are in existence to do such a heating duty on liquid media, and need not be considered further here as they form no part of the present invention.

In order to ensure a constant holding time in such a device, the working level must be maintained below the central axial shaft 16 and provided this is the case, the holding time is governed solely by the pitch of the screw 5 and its speed of rotation. In other words, there is formed a series of entirely separate compartments below a horizontal plane through the axis of the screw for receiving separate charges of the particles in the separate compartments whereby each charge has an accurately controlled transit time through the zone as determined by the speed of rotation and pitch of screw 5. It is thus important that the relative speeds of the feed pump 12 and the screw 5 are controlled to maintain a suitable level. The feed pump 12 and the outlet pump 8 serve as pressure seals on the device.

Figure 2:
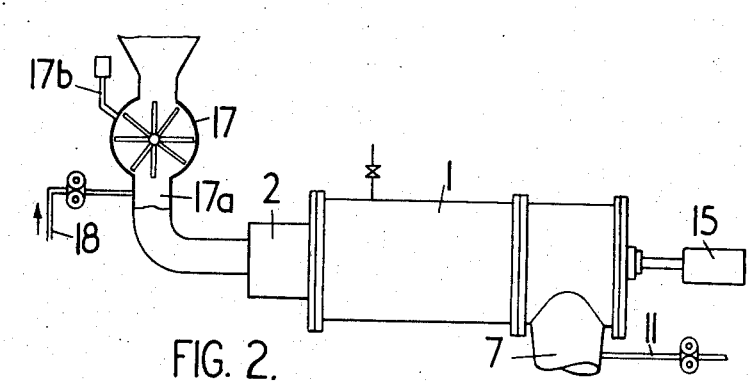
FIG. 2 illustrates a modification of the plant shown in FIG. 1.

If the solid particles are such that they cannot be pumped without damaging them (e.g. fruits) then the use of the arrangement shown in FIG. 2 may be a more suitable means of feeding the device. In this case, a rotary metering valve 17 in a gravity feed line 17a replaces the feed pump 12, the rate of feeding being governed by the speed of rotation of the valve. The valve acts as a seal to maintain the pressure within the heater. In this arrangement the liquid phase can be either pumped in at a low temperature to mix with the solids below the metering valve at 18 or preheated to sterilizing temperature and pumped in at 11 to mix with the solid before entering the holding tube. The rotary valve 17 is vented at 17b. In addition a valve similar to the valve 17 may be used at the outlet in place of the pump 8 in FIG. 1.

Figure 3:
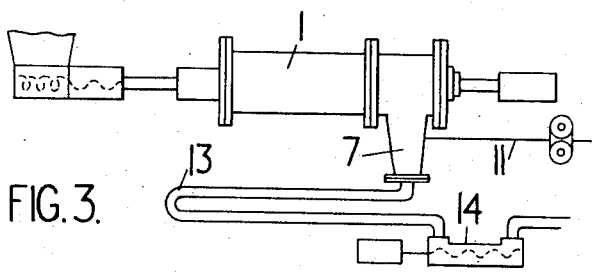
FIG. 3 shows a further modification of the plant of FIG. 1.

An alternative outlet arrangement shown in FIG. 3 eliminates the pump 8, the hopper 7 discharging directly into a holding tube 13. In this case, the pressure in the system is maintained at the outlet by a pressure reducing device, e.g. a positive pump 14 or a valve similar to the valve 17.

Various means of controlling the process are incorporated. Thus the speed of the rotating devices within cylinder 1 can be varied to adjust the holding time to that most suitable for heating various products to sterilization temperature. The temperature controller 10 controls the admission of steam to maintain a constant temperature at the entry of the holding device 13.

It may be necessary to add viscoelastic agents to promote plug flow in the holding tube. Such materials can be added with the liquid at point 11 or into the hopper before sterilizing.

The device is totally enclosed and can be presterilized by recirculation of pressurized hot water at a suitable temperature e.g. 20 minutes at 280° F. (138° C). Alternatively, steam sterilization can be employed for this presterilization.

Referring now to FIG. 4, it will be seen that instead of introducing the particles at one end of the cylinder 2, where immediate take up by the screw 5 might be problematical, an alternative arrangement is provided. The inlet end 2a of the cylinder 2 is journalled and thrust supported on a static extension 20 of an end member 21 of the outer pressure vessel 1. The extension 20 has an internal cavity 22 with the interior of the cylinder 2, and the screw 5 is extended through the cavity 22, its shaft being supported in a bearing 23 in the end member 21. The inlet tube 3 opens into an aperture 24 on the extension 20, and a clearance 25 around the tube 3 provides some connection between the cavity 22 and the interior of the pressure vessel 1.

The cylinder 2 is not perforated over most of its length but it provided with large slots 26 adjacent the outlet end of the screw 5, to act as discharge outlets from which the particles fall by gravity into an outlet 7, and also to allow ingress of steam from the pressure vessel. A sealing plate 28 is mounted on the shaft 16 to prevent or limit loss of pressure through a bearing 29a by which the shaft is supported in an end drive plate 29 of the cylinder 2.

The cylinder 2 is driven from variable speed motor 30 via a pinion 31 meshing with an external ring gear 32 on the plate 29. The shaft 16 is driven by a variable speed motor 33 via meshing gears 34 and 35.

Various modifications may be made within the scope of the invention. Thus the cylinder 2 of FIGS. 1 to 3 need not be perforated over all of its surface, but only sufficiently to allow steam to enter and liquid to leave freely.

Also, the contra-rotation of the inner cylinder 2 and the screw 5 is not always necessary to prevent carrying over of the particles by the screw.

Further, the operation may be controlled without a temperature probe, e.g. solely by maintaining a predetermined steam pressure.

We claim:
1. In a method of sterilizing particulate flowable solid material in continuous flow comprising conveying the particles of solid material through an atmosphere of steam at super atmospheric pressure: the improvement comprising mechanically conveying said particles through a zone in continuous flow while maintaining an atmosphere of steam at super atmospheric pressure in said zone, said particles being conveyed by a generally horizontal screw conveyor which is filled with said particles only to a level below the axis of the screw with said screw fitting closely within the confines of said zone and extending continuously upwardly beyond said level thereby forming a series of entirely separate compartments below a horizontal plane through the axis of said screw for receiving separate charges of said particles in the separate compartments, and continuously feeding material to the entry end of said screw conveyor at a rate less than that required to fill said compartments to said screw axis whereby each charge has an accurately controlled transit time through said zone as determined by the speed of rotation and pitch of the screw and whereby said particles are conveyed through said zone in a positive manner and the effective residence time of each particle in the atmosphere of steam at super atmospheric pressure is substantially the same.

2. A method as set forth in claim 1, comprising the further step of adding a sterilized liquid phase to the solid material after sterilization.

3. A method as set forth in claim 1, comprising the further steps of adding a visco-elastic agent to the solid material and passing the material with added visco-elastic agent to a holding stage after the solid material leaves the said atmosphere of steam.

References Cited

UNITED STATES PATENTS

| 1,301,409 | 4/1919  | Dupont      | 34—182 |
| 1,301,709 | 4/1919  | Du Pont     | 34—182 |
| 2,138,240 | 12/1938 | Kobuseh     | 34—182 |
| 2,086,072 | 7/1937  | Fauth et al.| 99—208 |
| 1,658,775 | 2/1928  | Campbell    | 34—182 |

FOREIGN PATENTS 43,460   4/1923   Norway.

NORMAN YUDKOFF, Primary Examiner

H. H. BERNSTEIN, Assistant Examiner

U.S. Cl. X.R.

99—211